Aug. 21, 1934.  H. E. CHURCHILL  1,970,690
TRANSMISSION CONTROL
Filed Feb. 13, 1933
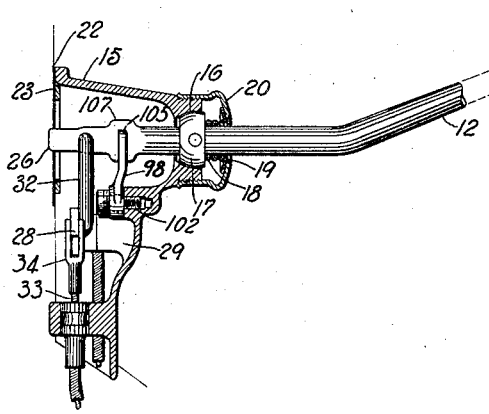
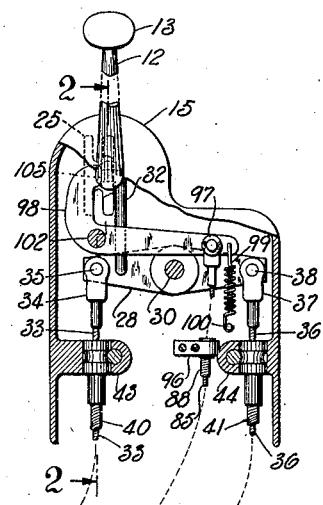
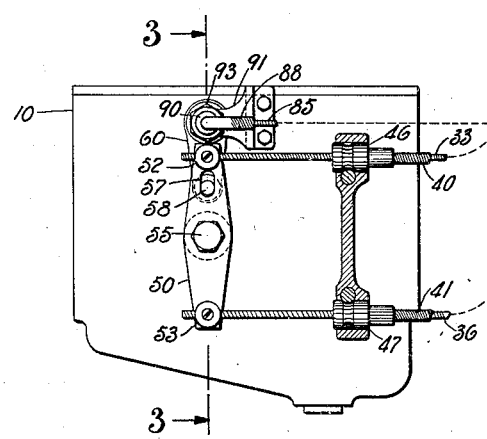
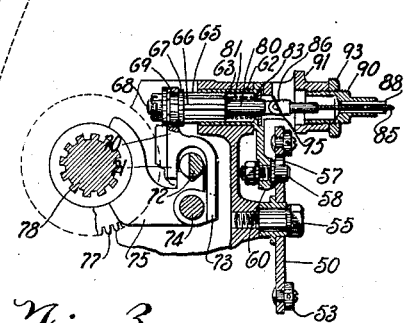
INVENTOR.
BY Harold E Churchill
ATTORNEY Patented Aug. 21, 1934

1,970,690

UNITED STATES PATENT OFFICE 1,970,690

TRANSMISSION CONTROL

Harold E. Churchill, South Bend, Ind., assignor to The Studebaker Corporation, South Bend, Ind., a corporation of New Jersey Application February 13, 1933, Serial No. 656,519

6 Claims. (Cl. 74—473)

This invention relates to improvements in shifting means for transmissions, and particularly to a shifting device adapted to be mounted at a distance from the transmission, and to actuate the transmission from such a remote location.

A further object resides in the provision, in a device of the character described, of flexible means connecting the shifting mechanism with the transmission.

A more specific object resides in the provision of such a flexible means in which the flexible members are always under tension.

A still further object resides in the provision, in a transmission shifting mechanism of the character described, of gear moving mechanism and independent gear selecting mechanism.

A still further object resides in the provision of a device of the character described which is simple and economical to manufacture, easy to install and operate, and which will not readily get out of order in use.

Other objects and advantages of the invention will appear as the description proceeds.

In the accompanying drawing I have shown a preferred mechanical embodiment of the idea of the invention. The drawing, however, is not to be taken as limiting the invention, the scope of which is to be measured entirely by the scope of the appended claims.

In the drawing:

Figure 1 is a side elevational view of a vehicle transmission showing my improved transmission shifting mechanism applied thereto, a portion of the shifting mechanism being shown in section to better illustrate the construction thereof.

Figure 2 is a sectional view on the line 2—2 of Figure 1, and

Figure 3 is a transverse sectional view of a portion of my improved shifting mechanism and a fragmentary portion of the transmission taken on the line 3—3 of Figure 1.

Referring to the drawing in detail, the numeral 10 indicates the casing of the change-speed transmission of an automotive vehicle, and the numeral 12 indicates a manually operable change-speed lever by means of which different gear ratios may be established in the transmission. The change-speed lever 12 carries at its outer or free end the usual knob 13 and at the end opposite the knob is pivotally mounted in a casing 15 by means of a universal joint illustrated in Figure 2. This universal joint comprises a socket 16 formed in the casing adapted to receive a ball member 17 mounted on the lever intermediate its ends. The ball member is retained in the socket by means of a compression spring 18 which surrounds a portion of the lever 12 and bears at one end against the ball member 17 and at the other end against a sliding plate 19 which in turn bears against the interior surface of a cap member 20 which is screw-threaded to the casing 15 surrounding the socket 16 and is provided with an aperture through which the lever 12 extends.

The casing 15 may be located in any position convenient to the driver of the vehicle but in the present illustration is shown as mounted on the dash member 22 under the vehicle cowl. Opposite the cap 20 the casing 15 is provided with a cover plate 23 having an H-shaped slot or indentation 25 therein. The end 26 of the lever 12 projects into this H-shaped slot and the slot forms a guide for the lever during its gear shifting movements.

A lever member 28 is pivotally mounted in the casing 15 by means of an apertured boss 29 formed on the casing and a pin 30 extending through the center of the lever and into the aperture in the boss. From an inspection of Figure 1, it will be observed that the pin 30 is below and laterally displaced from the end 26 of the change-speed lever 12 to such an extent that one end of the lever member 28 is substantially beneath the end 26 of the change-speed lever. A link member 32 is pivotally connected at one end to the lever member 28 adjacent to that end of the lever member beneath the end of the change-sped lever 12 and is pivotally connected at its upper end to the change-speed lever 12 adjacent to the end 26 thereof, whereby vertical movements of the change-speed lever 12 will cause the lever member 28 to oscillate about the pin 30. A flexible member 33 is connected to one end of the lever member 28 by means of a clevis 34 and pin 35, and a similar flexible member 36 is connected to the opposite end of the lever member 28 by means of a clevis 37 and a pin 38. These flexible members 33 and 36 extend through flexible casings 40 and 41 respectively, the ends of which are anchored to the casing 15 by means of suitable connections 43 and 44. The ends of the casings 40 and 41 opposite the connections 43 and 44 are anchored to the transmission casing 10 by means of similar connections 46 and 47, and the corresponding ends of the flexible members 33 and 36 project out of the casings and are pivotally connected to the opposite ends of a lever member 50 by means of suitable pivotal connections 52 and 53. The lever member 50 is pivotally secured to the side of the transmission casing 10 by means of a pin 55 extending through the center of the lever member and into the transmission casing. Between the pin 55 and the pivotal connection 52 the lever member 50 is provided with an elongated slot 57 into which projects a pin 58 carried by the free end of a lever member 60 rigidly secured to a tubular member 62 which is pivotally mounted in the transmission casing 10.

It will be observed from the above description that vertical movements of the end 26 of the change-speed lever 12 in the leg portions of the H-shaped slot 25 will cause the lever member 28 to oscillate about the pin 30 and that this oscillatory motion will be transmitted by the flexible members 33 and 36 to the second lever member 50 causing this second lever member to oscillate about the pin 55 in a manner similar to the lever member 28, and that the oscillatory movements of the lever member 50 will be transferred by the pin 58 to the lever 60 and from the lever 60 to the tubular member 62, whereby vertical movements of the change-speed lever 12 will cause the member 52 to rotate in opposite directions in its bearings in the transmission casing 10, depending on the direction of the vertical movements of the change-speed lever. As particularly illustrated in Figure 3, the tubular member 62 is provided interiorly thereof with longitudinal splines 63, and a cylindrical member 65 provided exteriorly thereof with corresponding splines 66 is axially slidably but non-rotatably mounted in the tubular member 62. At the inner end thereof the cylindrical member 65 is provided with a collar 67 and a threaded end 68 separated by a reduced portion 69 upon which is secured against relative rotation a fork member 70. This fork member 70 has a short vertical leg 71 adapted to engage in a notch in the shifter bar 72 when the cylindrical member 65 is moved to the right from the position illustrated in Figure 3, and a long leg 73 adapted to engage in a notch in the shifter bar 74 when the member 65 is moved to the left from the position illustrated in Figure 3. From this description it will be observed that rotation of the members 62 and 65 by the lever arm 60 will rotate the fork member 70 and this member will in turn move one of the shifter bars 72 or 74 longitudinally, depending upon the position of the member 65. The shifter bars 72 and 74 are connected with the gears of the change-speed transmission by means of suitable shifter forks, one of which is illustrated at 75 in Figure 3. Some of the transmission gears, one of which is indicated at 77, may be slidably but non-rotatably mounted upon the corresponding transmission shaft such as 78 in order to effect different speed ratios through the transmission. Still referring to Figure 3, it will be observed that the cylindrical member 65 is provided at the end thereof, opposite the threaded end 68, with a reduced extension 80 surrounded by a coiled compression spring 81 which bears at one end against a suitable abutment in the form of a collar 83 and serves to resiliently urge the member 65 to the left from the position illustrated in Figure 3.

A flexible member 85 is connected to the extension 80 by means of a clevis 86 and is enclosed, except for its end portions, in a flexible casing 88, through which it is longitudinally slidable. The transmission end of the casing 88 is rigidly secured to a threaded abutment member 90 which is screw-threaded into a threaded aperture provided in a bracket 91 formed on the transmission casing 10 and extending over the end of the tubular member 62, a lock nut 93 being provided to maintain the abutment member 90 in adjusted position in the bracket 91. A lug or key 95 secured in the bracket 91 bears against the outer end of the tubular member 62 at one edge thereof, the tubular member being provided at this end with a flange or collar which bears at one side against a shoulder formed on the casing 10 and at the opposite side against the key 95 to prevent axial movement of the tubular member.

Referring now to Figure 1 it will be observed that the flexible member 85 and its casing 88 extend from the transmission into the casing 15. The upper end of the flexible casing 88 is rigidly anchored to the casing 15 by a suitable anchoring means 96 and the extending end of the flexible member 85 is secured by a suitable pivotal connection such as the clevis 97 to the longer leg of a bell crank lever 98 adjacent to the end thereof. A coiled tension spring 99 is connected at its upper end to the end of the longer leg of the bell crank lever 98 and at its lower end to a pin 100 rigidly secured to the casing 15. It will be observed that the spring 99 by resiliently urging the end of the longer arm of the bell crank lever 98 downwardly assist the spring 83 in urging the cylindrical member 65 to the left from the position illustrated in Figure 3.

The bell crank lever 98 is pivotally secured to the casing 15 by means of a fixed pivot pin 102, and the shorter arm of this bell crank lever extends to a position midway the horizontal cross portion of the H-shaped slot 25 and is there provided with a bearing portion 105 against which an enlargement 107, formed on the change-speed lever 12 between the end 26 thereof and the ball member 17, is adapted to bear.

From the above description it will be observed that horizontal movement of the change-speed lever 12 together with the resilient action of the springs 83 and 99 will cause the bell crank lever 98 to oscillate about the pin 102, and that movement of the end of the longer arm of the bell crank lever in an arc about the pin 102 will cause the flexible member 85 to slide through the casing 88, thereby causing the cylindrical member 65 to move longitudinally in the tubular member 62 in response to horizontal movement of the change-speed lever 12. More specifically it will be observed that when the knob 13 of the change-speed lever 12 is moved to the left from the position illustrated in Figure 1, the pressure of the portion 107 of the change-speed lever against the abutment 105 of the bell crank lever 98 will be relieved and the spring 99 will draw the end of the longer leg of the bell crank lever downwardly, thereby causing the flexible member 85 to move downwardly through the casing 88. This movement of the member 85 relative to the casing 88 together with the assistance of the spring 83 will cause the member 65 to move to the left from the position illustrated in Figure 3, thereby engaging the leg 73 of the fork 70 in the notch provided in the shifter bar 74. Vertical movement of the change-speed lever will now move the shifter bar 74 longitudinally through the transmission and cause the shifter fork 75 to slide the gear 77 on the shaft 78 in both directions from its central or neutral position to selectively accomplish either of two of the gear ratios with which the transmission is provided. Similarly, if the knob 13 of the change-speed lever 12 be moved to the right from the position illustrated in Figure 1, the enlarged portion 107 thereof will bear against the abutment 105 of the bell crank lever 98, forcing the end of the longer arm of the bell crank lever upwardly against the resilient action of the springs 99 and 83, thereby moving the flexible member 85 upwardly through the casing 88. This movement of the member 85 relative to the casing 88 will pull the member 65 to the right from the position illustrated in Figure 3, thereby causing the shorter leg 71 of the fork 70 to engage in the notch in the the shifter bar 72. Vertical movement of the change-speed lever 12 will now cause the shifter bar 72 to move longitudinally through the transmission in either direcon from its central or neutral position and by reason of the operative connection of the shifter bar 72 with another sliding gear of the transmission, not illustrated, will effect the other two of the gear ratios with which the transmission is provided.

From the above description it will be observed that the transmission mechanism will be immediately brought to neutral when the change-speed lever 12 is returned to its central position, that is, that position in which the end 26 thereof occupies a location substantially midway of the horizontal cross portion of the H-shaped slot 25.

While I have illustrated and described in detail a preferred mechanical embodiment of the idea of the invention, it is to be understood that the invention is not limited to the detailed structure described and illustrated, but that such changes in the size, shape and arrangement of parts may be resorted to as come within the scope of the appended claims.

Having now described a preferred form of my invention and the method of operation thereof so that others skilled in the art may clearly understand the same, what I desire to secure by Letters Patent is as follows:

What I claim:

1. In combination with a change-speed transmission having shifter bars, a remote control shifting mechanism for said transmission comprising, a shift lever, means operatively connected with said lever, including flexible cables for moving said shifter bars, and means operated by the initial movement of said lever from neutral position including a flexible member for selectively connecting said first means with one or another of said shifter bars.

2. In combination with a change-speed transmission having shifter bars, a remote control shifting mechanism for said transmission comprising, a shift lever, means operatively connected with said lever including flexible tension members for moving said shifter bars, and means operated by the initial movement of said lever from neutral position comprising a flexible tension member for selectively connecting said first means with one or another of said shifter bars.

3. In combination with a change-speed transmission having shifter bars, a remote control shifting mechanism for said transmission comprising, a shift lever, means operatively connected with said lever including flexible tension members for moving said shifter bars, and means operated by the initial movement of said lever from neutral position comprising a flexible tension member and a resilient member for selectively connecting said first means with one or another of said shifter bars.

4. In combination with a change-speed transmission, a shifting mechanism for said transmission comprising, a change-speed lever mounted in a location remote from said transmission, means including flexible tension members connecting said change-speed lever with said transmission for moving the gear shifting elements of the transmission, and means operated by the initial movement of said lever from neutral position including a flexible tension member for selectively connecting said first means with one or another of said gear shifting elements.

5. In combination with a change-speed transmission, a shifting mechanism for said transmission comprising, a change-speed lever mounted in a location remote from said transmission, a casing for supporting said change-speed lever, means including flexible tension members connecting said change-speed lever with said transmission whereby vertical movements of said change-speed lever will move the gear shifting element of said transmission, and additional means including a spring in said casing operatively connected with said change-speed lever and with said transmission whereby initial movement of said change-speed lever from neutral position will selectively connect said first means with one or another of said gear shifting elements.

6. In combination with a change-speed transmission, a shifting mechanism for said transmission comprising, a change-speed lever mounted in a location remote from said transmission, a casing for supporting said change-speed lever, a lever member in said casing operatively connected with said change-speed lever and connected by flexible tension means with a corresponding lever member mounted on said transmission, means operatively connecting said transmission mounted lever member with the gear shifting elements of said transmission for moving said gear shifting elements, an additional lever member in said supporting casing connected with said last named means by a flexible tension member adapted to be moved in one direction by said change-speed lever, a spring for moving said additional lever member in the opposite direction, whereby said additional lever member will selectively connect said means with one or another of said gear shifting elements.

HAROLD E. CHURCHILL.